United States Patent
Shimomura

[15] 3,699,868
[45] Oct. 24, 1972

[54] COUPLING DEVICE FOR EXPOSURE METER TO APERTURE OF INTERCHANGEABLE LENS IN SINGLE-LENS REFLEX CAMERA

[72] Inventor: Jun Shimomura, Tokyo, Japan
[73] Assignee: Nippon Kogaku K.K., Tokyo, Japan
[22] Filed: April 13, 1970
[21] Appl. No.: 27,757

[30] Foreign Application Priority Data

April 18, 1969 Japan ..................... 44/29640

[52] U.S. Cl. .................................................. 95/64 R
[51] Int. Cl. ....................................................... G03b 9/02
[58] Field of Search ........................... 95/10 C, 64 R

[56] References Cited

UNITED STATES PATENTS

| | | |
|---|---|---|
| 3,532,036 | 10/1970 | Nakamura .................. 95/64 R |
| 3,439,600 | 4/1969 | Suzuki ......................... 95/64 X |
| 3,495,514 | 2/1970 | Nakamura .................. 95/10 C |
| 3,552,289 | 1/1971 | Fujimoto ..................... 95/64 R |
| 3,485,153 | 12/1969 | Ono et al. ................... 95/64 R |
| 3,461,783 | 8/1969 | Fujii ............................ 95/64 R |

Primary Examiner—Samuel S. Matthews
Assistant Examiner—Russell E. Adams, Jr.
Attorney—Marn and Jangarathis

[57] ABSTRACT

An improved coupling assembly is provided for coupling the exposure meter to an aperture ring of an interchangeable objective lens in a single-lens reflex camera to correct the exposure calculating mechanism in response to the maximum aperture of a lens utilizing the TTL full-aperture exposure measuring method. The correction about the maximum aperture of the lens mounted is automatically made to the exposure calculating mechanism of the built-in exposure meter of the camera when the lens is mounted with its aperture being maintained at maximum opening.

5 Claims, 11 Drawing Figures

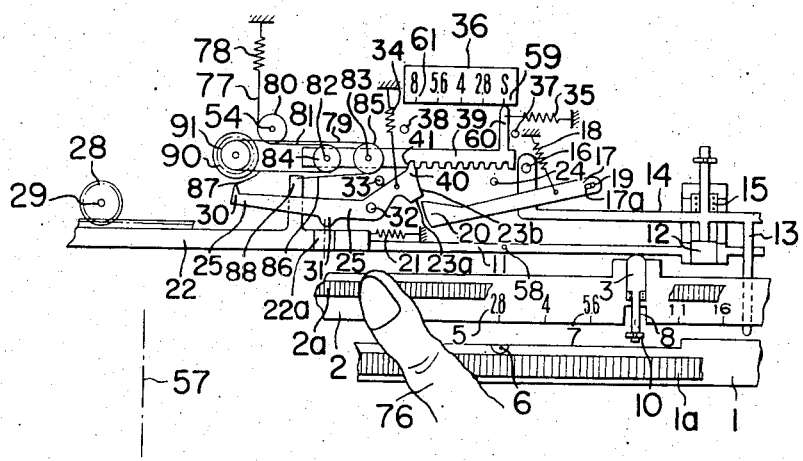

COUPLING DEVICE FOR EXPOSURE METER TO APERTURE OF INTERCHANGEABLE LENS IN SINGLE-LENS REFLEX CAMERA

BACKGROUND OF THE INVENTION

The present invention generally relates to single-lens reflex cameras, and more particularly to an assembly for coupling the apertures of interchangeable lenses to an exposure meter of a single-lens reflex camera to compensate the exposure meter for difference f numbers of an interchangeable lens.

The single-lens reflex cameras now widely use the so-called "TTL" (through-the-lens), full aperture photometry system, in which a photo lens is normally maintained at full open states of its diaphragm and light passing through the photo lens is measured for determination of exposure. It is well known in the art that the correction in response to the full open relative aperture of each interchangeable lens must be effected by an exposure calculating mechanism, and various methods for correction have been proposed. For example, one of the most simplest proposals is to provide an interchangeable lens with a signal member which is fixed to the aperture ring or bayonet of the lens for generating a signal depending upon the full open relative aperture of the lens. Although such signal member may by simple in its construction, it will be noted that, the group of the interchangeable lenses which has been used before the so-called "TTL" full aperture photometry system was introduced, must be provided with such a signal member if they are to be attached to and be used for the new type single reflex cameras having the so-called "TTL," full aperture photometry system. To provide such a signal member additional machining is necessary.

Most of the camera makers were required to exert their service section for the customers who has the old type interchangeable lenses at customer's own charge or without charge. In order to eliminate such after-service as described above, there has been proposed a method in which an interchangeable lens having only one coupling member on an aperture ring is attached to the camera body and then the aperture ring of the lens is rotated so as to open the lens at its full aperture, thereby generating and transmitting to the exposure meter for correction the signal which represents the full open relative aperture of the lens. However, by this method, it is required to check to determine if the correction of the fully opened relative aperture by the rotation of the aperture ring is effected, and failing such determination, over- or under-exposures will result.

OBJECTS OF THE INVENTION

An object of the present invention is to provide a coupling assembly for automatically correcting an exposure meter of a single-lens reflex camera for the full open relative aperture of an interchangeable lens mounted thereto when the lens is mounted with its aperture ring being at fully opened position.

Another object of the present invention is to provide a coupling assembly to permit a single-lens reflex camera to effect photometry at the full aperture of an interchangeable lens even though conventional lenses are not provided with a member for generating a signal in order to correct about the fully opened relative aperture thereof, without any modification of the lens.

SUMMARY OF THE INVENTION

According to the present invention, a novel coupling assembly is provided for a single-lens reflex camera of the type in which an aperture setting device of an interchangeable lens is operatively coupled to a built-in exposure measuring device of the camera and wherein a photosensitive element of said built-in exposure measuring device is placed in the optical path of the objective lens. An interchangeable lens is provided with a member for coupling the exposure meter of the camera with said member being placed at a f-number position which is common to all interchangeable lenses or at a position spaced apart by a predetermined distance from said first mentioned position. The interchangeable lens is provided with an aperture index mark which is placed in opposed relationship with the aperture ring and at a predetermined position relative to the camera body when the lens is mounted thereto. The interchangeable lens is mounted with the aperture ring being maintained at maximum opening whereby the exposure adjustment device of the camera is automatically effected.

The following advantages are accrued from the present invention:

1. Since the aperture ring of the lens is fully opened when the lens is mounted to the camera body, the exposure meter of the camera is automatically corrected to the $f$-number of the maximum aperture of the lens. Therefore, it is not necessary to provide an interchangeable lens with a signal generating member associated with a maximum aperture of the lens. Thus, conventional interchangeable lenses having only one coupling member for coupling the aperture ring to the exposure meter may be used in TTL system photometry of the full aperture. Furthermore, interchangeable lenses are not required to be provided with the maximum aperture correction signal generating members which are imperative for TTL system photometry of the full aperture by additional machining, the replacement of parts or attachment of new parts.

2. In the course of mounting of an interchangeable lens with its aperture ring being maintained fully opened, the exposure meter is automatically corrected for the maximum aperture of the fully opened $f$-number of the lens and this correction is completed when the lens is mounted obviating the necessity to check calibration. Therefore, it is not necessary to rotate the aperture ring to its fully opened position after the mounting of the interchangeable lens to the camera body as in the case of the conventional method.

3. The construction is simple as compared with the conventional systems which require the correction for the maximum aperture of the mounted lens.

4. Each interchangeable lens is provided with a coupling member located on the aperture ring of the lens for coupling the lens to the camera body, with the coupling member being provided at the same position and at the position of predetermined common aperture values relative to each interchangeable lens. Therefore, the lens opening of an interchangeable lens can be indicated in a view finder in a simple and easy manner because the predetermined $f$-number of each lens is placed at the predetermined and same position relative to the lens coupling member of the camera when the lens is mounted to the camera body.

5. The correction scale for the f-number of the maximum aperture is graduated on the stationary member of the camera body to permit reading of the scales, and if required, the scales may be viewed through a viewfinder.

6. Even if the lens lock button is depressed on purpose or carelessly by mistake, the clamping mechanism is not adversely effected at all prior to he attachment of the lens (the lens is not attached to the camera body) or after the attachment, even though the signals representative of the starting and completion of the lens mounting are fed through the lens lock button which may be reached from the exterior at any time and through the lens locking pin which is made integral with the lens lock button in order to clamp the elements of the differential mechanism in the exposure meter.

7. The maximum aperture correction mechanism is not adversely affected at all even if the aperture indicating ring on the camera body which is coupled with the aperture ring of the lens is rotated on purpose or by mistake when the lens is removed from the camera body; and 8. Even if the lens has no coupling member for coupling the lens aperture to the exposure meter on the side of the camera body, the lens is mounted thereon, the stopdown photometry can be effected without any special operation of the exposure meter.

These and other objects, features and advantages of the present invention will become more apparent from the following description of illustrative embodiments thereof when taken in conjunction with the accompanying drawings.

BRIEF DESCRIPTION OF THE DRAWINGS

FIG. 4 illustrating the lens being pressed against the camera body; FIG. 5 illustrating the lens being mounted; and FIG. 6 illustrating the completion of the mounting of the lens;

FIGS. 8, 9 and 10 are views similar to FIGS. 4, 5 and 6, respectively, illustrating the steps of mounting of an interchangeable lens to the camera body of FIG. 7; FIG. 8 illustrating the lens being pressed against the camera body; FIG. 9 illustrating the lens being mounted; and FIG. 10 illustrating the completion of mounting of the lens.

DESCRIPTION OF THE PREFERRED EMBODIMENTS

Figure 1:
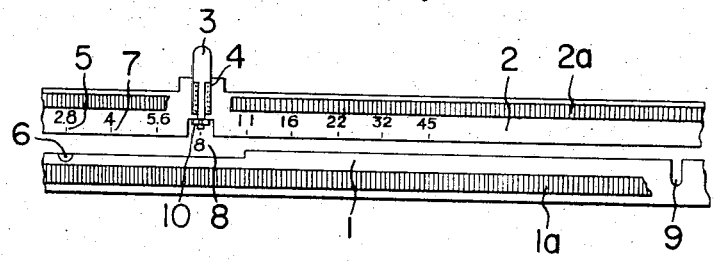
FIGS. 1 and 2 are developed views illustrating the stationary members and aperture rings of interchangeable lenses having the full open relative apertures of $f/2.8$ and $f/5.6$, respectively.

The lens of one embodiment of the present invention will be described first with reference to FIG. 1. An aperture ring 2 is rotatably fitted over a lens body 1 for rotation through an angle for setting a predetermined range of apertures. For example, in the case of an interchangeable lens having a maximum aperture of $f/2.8$, the aperture ring 2 is permitted to rotate through a predetermined range from $f/2.8$ to $f/4.5$ of a scale 7 about an aperture index 6. The aperture index 6 is placed upon the lens body 1 at a fixed position relative to each interchangeable lens. Both the lens body 1 and the aperture ring 2 have knurled portions 1a and 2a, respectively, for facilitating the holding and operation of the lens body 1. The aperture ring 2 has a pin 3 for coupling the aperture ring 2 with an exposure meter of the camera, as more clearly hereinafter described. The pin 3 is normally biased by a spring 4 so as to extend into the camera body, but is capable of being retracted when a force is applied thereto against the spring 4. The coupling pin 3 is disposed on the aperture ring 2 at the position of predetermined lens opening which is common about every interchangeable lens, for example, at the position of $f/8$. The pin 3 is prevented from being pulled out of the aperture setting ring 2 by means of a stopper 10.

Figure 2:
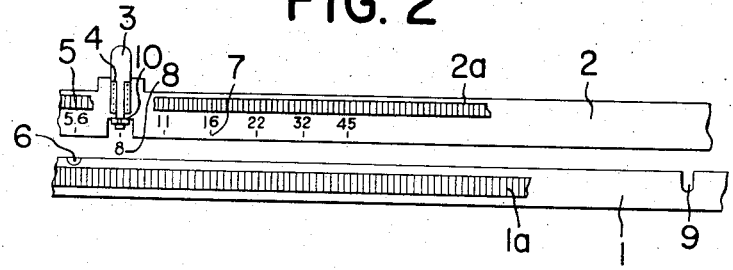
Figure 7:
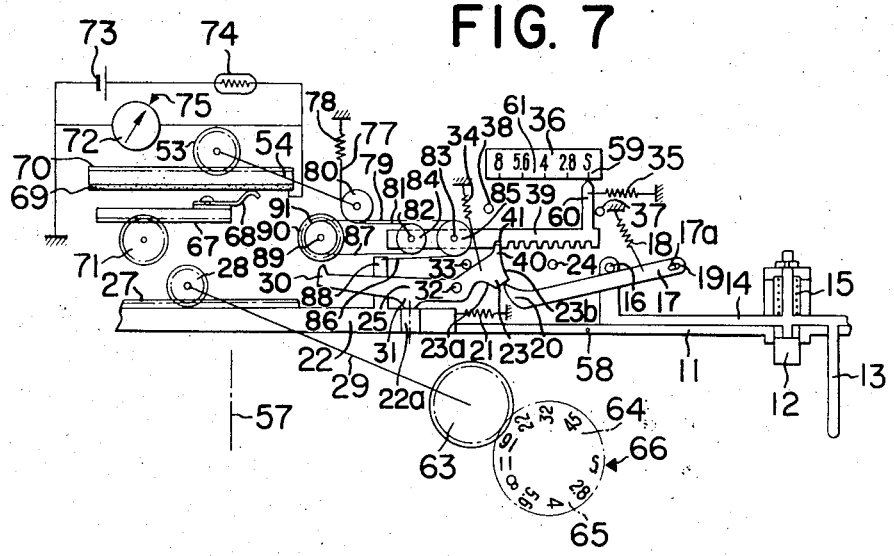
FIG. 7 is a developed view of a second embodiment of the present invention with an interchangeable lens being removed.

The lens body 1 is provided with a notch 9 which is positioned at a predetermined position relative to every interchangeable lens and into which is fitted a locking pin 13 extending from the camera main body, when the mounting of the lens to the camera is completed (see FIG. 7). FIG. 2 illustrates an interchangeable lens 1 having a maximum aperture of $f/5.6$. The aperture ring illustrated in FIGS. 1 and 2 is of the type having only one coupling member 3 for coupling the exposure meter of the camera body at the position of the lens opening of $f/8$ which is common about every lens, and were most generally used before the full-aperture measuring method had been introduced in a single-lens reflex camera.

Figure 3:
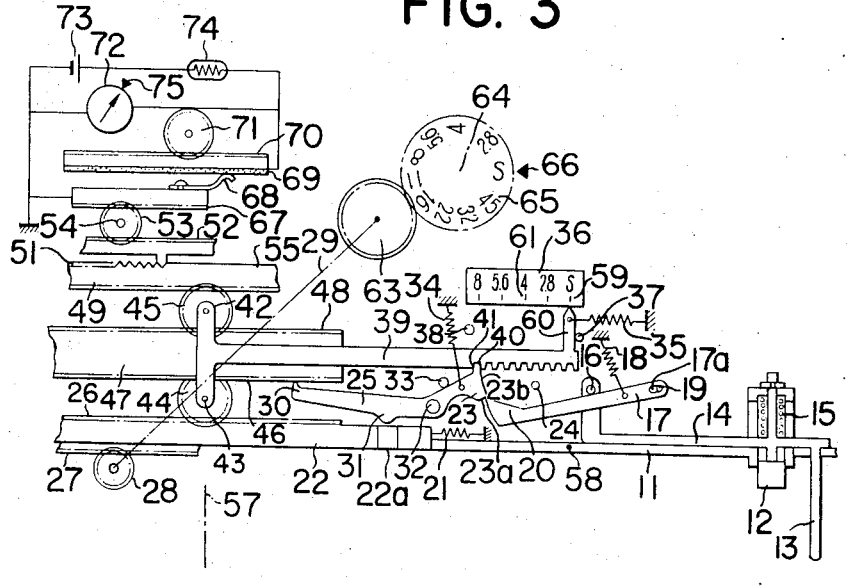
FIG. 3 is a developed view of a first embodiment of the present invention with an interchangeable lens being removed.

The present invention will be described in more detail with reference to FIG. 3 illustrating the construction of an exposure meter of the camera. A portion 11 integral with the camera body has a lens mounting reference mark 58 positioned in a predetermined spaced distance and angular relationship with a reference position 57 immediately above the optical axis of the lens. The portion 11 also has a lens lock button 12 and the hereinabove described lens locking pin 13 which is integral with the lens lock button 12 and is slidable coaxially with the optical axis of the lens. Both the lens lock button 12 and the lens locking pin 13 are normally biased toward the camera body 11 by means of a spring 15. The above described construction is well known in the art.

An arm 14 integrally formed with the lens lock button 12 is provided with a pin 16 which engages a clamp lever 17. The clamp lever 17 is pivotably mounted by means of a pin 19 to the camera body and is normally biased by means of a spring 18 so as to rotate in the clockwise direction. A fixed pin 24 extending from the camera body limits the rotation of the clamp lever 17 in the clockwise direction. The pin 19 is fitted into an elliptical slot 17a formed in the clamp lever 17 having a major axis in the longitudinal direction of the lever 17 and is normally in contact with the right edge of the slot 17a by means of a spring 18. The clamp lever 17 is provided with a pawl 20 formed at the end remote from the slot 17a, the pawl 20 being in engagement with the lower edge 23a of a projection 23 extending from one end of a locking lever 25.

The locking lever 25 is pivotably mounted to the camera body by means of a pivot 32 and is normally biased by means of a spring 34 in the counterclockwise direction. The profile of side edge 23b of the projection 23 of the lever 25 is concaved downwardly relative to the pivot 19. The side edge 23b is provided with a projection 40 extending upwardly and fitted into one of the notches 41 in a ring 39, each of which notch corresponds to a maximum aperture of full open f-number of various interchangeable lenses, thereby holding the correction ring 39 stationarily at a predetermined position. The end of the lever 25 remote from the projection 23 is formed with a hook 30 disposed in opposed relation with a gear face 46 of an interlocking ring 47. The locking lever 25 is also provided with a projection 31 extending downwardly from an intermediate portion of the lever 25 in opposed relationship to an engaging hole 22a bored through an aperture indicating ring 22 into which is fitted the coupling pin 3 of the lens. A pin 33 extending from the camera body serves to limit the rotation of the locking lever 25 in the counterclockwise direction.

The aperture indicating ring 22 is provided with a gear or toothed portion 26 which is meshed with a planetary gear 44 positioned on a shaft 43 of the correction ring 39 and a gear or toothed portion 27 which is meshed with a gear 28. The gear 28 is coupled to an aperture scale indicating system to be described in more detail hereinafter. The aperture indicating ring 22 is normally pressed against the stationary portion 11 of the camera by means of a spring 21. The aperture scale indicating system is comprised of the gear 28, a coupling shaft system, generally indicated as 29, an intermediate gear 63, an aperture indicating disk 64, and a fixed mark 66 on the camera body. Thus, the aperture scale 65, for example, may be indicated within a viewfinder of the camera.

The correction ring 39 is provided at one end thereof with an index member 60 which is normally pressed against a pin 37 extending from the camera body. The index member 60 is adapted to indicate a maximum aperture or full open f-number of any interchangeable lens by indicating one of the graduated scales 61 upon a correction scale plate 36 fixed to the camera body. A pin 38 fixed to the camera body serves to limit the displacement of the correction ring 39 in the left direction (See FIG. 3). The correction ring 39 is provided with a pair of gears 44 and 45 rotatably disposed on shafts 43 and 42, respectively. The gear 44 is meshed with the toothed portion 26 of the aperture indicating ring 22 and with a gear or toothed portion 46 of the interlocking ring 47. The gear 45 is meshed with a gear or toothed portion 48 of the interlocking ring 47 and a gear or toothed portion 49 of an exposure adjustment ring 55. The exposure adjustment ring 55 holds a film sensitivity setting ring 52 in such a relation that both members are capable of adjusting their mutual position.

The film sensitivity setting ring 52 is operatively coupled through an intermediate gear 53 rotatably disposed on a shaft 54 with a brush supporting member 67 having a brush 68 in slidable contact with a resistor 69. The exposure meter circuit is provided with a photosensitive element 74 disposed in the optical path of a photo lens which is normally fully opened (known as a "TTL system" to those skilled in the art). The exposure meter circuit is comprised of a power source 73, an indicator 72, the adjustable resistor 69 operatively coupled with a shutter dial through a gear 71, a supporting member 70 for the adjustable resistor 69 and the brush 68.

Figure 4:
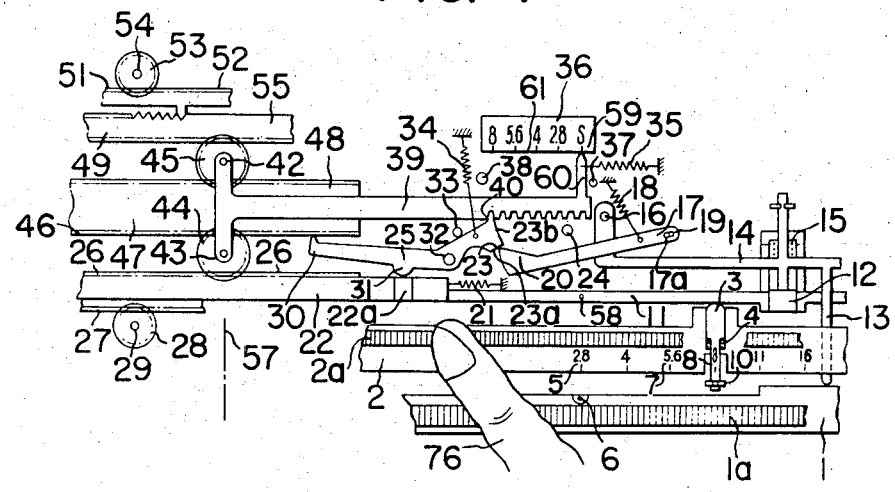
FIGS. 4, 5 and 6 are views illustrating the steps of mounting of an interchangeable lens to a camera body of FIG. 3.

Next the mode of operation of the instant embodiment will be described hereinafter. FIG. 3 illustrates the relative positions among various components when a lens is not mounted to the camera. As shown in FIG. 4, the f/2.8 lens illustrated in FIG. 1 is mounted to the camera with the aperture ring 2 being maintained fully opened. That is, the lens is pressed against the camera body 11 by a hand 76 in such a manner that the aperture index 6 of the lens body 1 is aligned with the maximum aperture opening scale 5 (in this case 2.8) of the aperture ring 2. It should be noted that the aperture index 6 upon the lens body 1 is placed at a predetermined position relative to every interchangeable lens and to the camera body 11 when a lens is mounted thereto. Thus, the index 6 serves as a lens mounting index to be lined with the lens mounting index 58 on the side of the camera body 11. Therefore, in FIG. 4 the index 6 on the lens body is in alignment with the index 58 on the camera body while the coupling pin 3 of the aperture ring 2 of the lens is retracted because the pin 3 is pressed by the camera body. Furthermore, the lens locking pin 13 of the camera body is also retracted inwardly since the lens body presses the locking pin 13 to compress the spring 15 whereby the arm 14, and consequently the pin 16, are retracted as shown in FIG. 4. It should be noted tht the clamp lever 17 remains in the same position as shown in FIG. 3 because the pawl 20 of the clamp lever 17 is pressed against the lower edge 23a of the lock lever 25 so that the rotation in the clockwise direction of the clamp lever is prevented.

Figure 5:
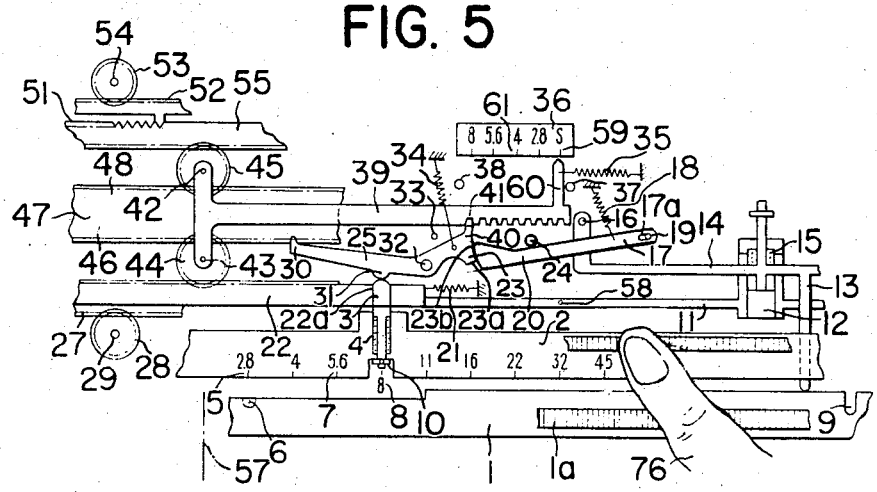

Next the lens 1 and the aperture ring 2 are rotated in the counterclockwise direction until the coupling pin 3 of the aperture ring 2 of the lens is fitted into the engaging hole 22a of the aperture indicating ring 22 of the camera body as shown in FIG. 5. Thus, the coupling pin 3 pushes the projection 31 of the lock lever 25 so that the latter is caused to rotate in the clockwise direction. Consequently, the hook 30 of the lock lever 25 engages the gear or toothed face 46 of the interlocking ring 47 so that the latter is held in stationary position. At the same time, the lower edge 23a of the projection 23 of the lock lever 25 pushes the pawl 20 of the clamp lever 17 to cause the latter to rotate in the counterclockwise direction. Thus, the engagement of the projection 40 of the lock lever 25 with the notch 41 of the correction ring 39 is released so that the ring 39 is permitted to rotate in the counterclockwise direction or the left in FIG. 5. Upon disengagement of the projection 40 from the notch 41, the point of contact of the pawl 20 of the clamp lever 17 with the lock lever 25 reaches from the lower side edge 23a at the extreme end 23 thereof.

When the pawl 20 passes beyond the extreme end 23, the clamp lever is immediately rotated by means of the spring 18 in the clockwise direction until the clamp lever 17 is stopped by the fixed pin 24, as shown in FIG. 5. The left side edge of the pawl 20 of the clamp lever 17 is formed with a profile which mates with the side edge 23b of the projection 23 of the lock lever 25, so that rotation in the counterclockwise direction of the lock lever 25 is prevented and held in position by the clamp lever 17 (as shown in FIG. 5) even though the coupling pin 3 does not contact the projection 31 of the lock lever 25 as the pin 3 is displaced to the left. When the lens is further rotated in the counterclockwise direction or the left in FIG. 5, the motion of the aperture indicating ring 22 is transmitted to the planetary gear 44 thereby moving the correction ring 39 to the left since the interlocking ring 47 is fixedly held in position. The movement of the correction ring 39 is transmitted to the intermediate gear 53 through the planetary gear 45, the exposure adjustment ring 55 and the film sensitivity setting ring 52 so that the correction values, depending upon the maximum aperture or full open f-number of each lens mounted to the camera, is introduced to the exposure calculating mechanism.

Figure 6:
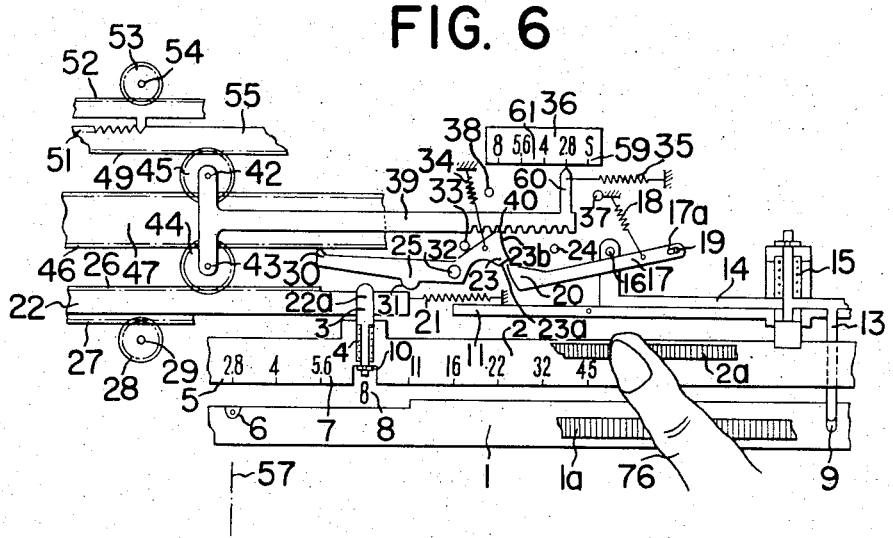

When the lens is further rotated to the position as shown in FIG. 6, the index 6 on the lens 1 reaches a point immediately above the optical axis of the camera 57 whereby the lens is completely mounted to the camera. The lens locking pin 13 of the camera body is fitted into the hole 9 formed in the lens body 1 so that the further rotation to the left of the lens body 1 is not permitted. Simultaneously, the pin 16 on the arm 14 integral with the locking pin 13 is caused to return to its normal position under the action of the spring 15 thereby causing the clamp lever 17 to rotate in the counterclockwise direction against the spring 18, whereby the left side edge of the pawl 20 of the clamp lever 17 is moved away from the side edge 23b of the lock lever 25. In order to ensure the return to the position shown in FIG. 6 of the clamp lever 17 by the pin 16 even when the left side edge of the pawl 20 of the clamp lever 17 may interfere with the projection 23 of the lock lever 25 to some extent, the pivot 19 for the clamp lever 17 is fitted into the elongated slot 17a of the clamp lever 17 so that the lever 17 may be slidably moved in the longitudinal direction thereof. Therefore, as shown in FIG. 6, the pawl or end 20 of the clamp lever 17 is disposed against the lower side edge 23a of the lock lever 25. Thus, the lock lever 25 is permitted again to rotate in the counterclockwise direction by the spring 34 to cause the projection 40 of the lock lever 25 to engage one of the notches 41 which corresponds to the full open f-number of the mounted lens of the correction ring 39 whereby the ring 39 is held stationary relative to the camera body. Such counterclockwise rotation of the lock lever 25 causes the hook 30 of the lock lever 25 to disengage the toothed portion 46 of the interlocking ring 47.

Now, when the aperture ring 2 of the lens is rotated in FIG. 6, rotation is transmitted to an exposure adjustment mechanism through the toothed portion 26, the planetary gears 44 and 45 (which are not permitted to move relative to the camera body and the interlocking ring 47 displaced relative to the camera body), the gear or toothed portion 49, the exposure adjustment ring 55, the film sensitivity setting ring 52 and the intermediate gear 53. At the same time, the selected aperture is indicated by the aperture indicating disk 64 and the mark 66 through the toothed portion 27 of the aperture indicating ring 22, the gear 28, the coupling shaft system 29 and the intermediate gear 63. The maximum aperture or the full open f-number of the lens mounted to the camera is indicated by the projection 60 and the maximum aperture or the full open f-number scale 36. The scale S or 59 is the position which is indicated by the index member 60 when no lens is mounted to the camera. Thus, when the lens or the other optical system which has no coupling pin 3 is used for the photometry of stop-down measuring method, said mark S and index 60 serves as the indicating scale for the stop-down measuring which indicates that an aperture control member for the exposure meter is located at a standard position. When the lens which is to be mounted to the camera having the maximum aperture of f/5.6 as shown in FIG. 2, the maximum aperture or full open f-number correction is started when the coupling pin 3 reaches the position shown in FIG. 5, and is completed when the index 6 upon the lens reaches the position 57 immediately above the optical axis. It will be seen that the index member 60 indicates 5.6 upon the full open f-number correction scale 36.

The second embodiment of the present invention will be described hereinafter with reference to FIGS. 7 to 11. The second embodiment uses a differential mechanism employing a flexible member such as a belt, string, chain or the like instead of the planetary gears described with reference to the first embodiment. As shown in FIG. 7, the second embodiment has the similar construction as the first embodiment except that the calibration ring 39 is provided with pulleys 84 and 85 rotatably disposed on shafts 82 and 83, respectively. Further more, the aperture indicating ring 22 is not provided with the toothed portion 26, but is provided with a projection 88 to which is fixed one end of a flexible member 86. A pulley 91 made integral with a gear 90 is rotatably mounted to the camera body by a shaft 89 and the hook 30 of the lock lever 25 similar to that used in the first embodiment is in opposed relation with the teeth of the gear 90. The flexible member 86 extends from the projection 88 of the aperture index ring 22 over the pulley 85 as shown by 86, over the pulley 91 as shown by 79, over the pulley 84 as shown by 87 and finally around the pulley 80 as shown by 81 which is rotatably mounted to the camera body. The pulley 80 serves to impart the tension to the flexible member indicated by 81, 87, 79 and 86 by a spring 78 through a belt 77.

The pulley 80 is operatively coupled to the variable resistor 69 through the shaft 54, the intermediate gear 53 and the member 70 carrying the variable resistor 69. The variable resistor 69 is a part of the calculating mechanism of the exposure meter and is made into a slidable contact with the brush 68 when the exposure is adjusted. The brush supporting member 67 is displaced through the gear 71 in response to the movement of the exposure control member, such as a film sensitivity setting or shutter speed setting member. The exposure meter has the photosensitive element 74, the battery 73, the indicator 72 and the mark 75 as with reference to FIG. 3.

Figure 10:
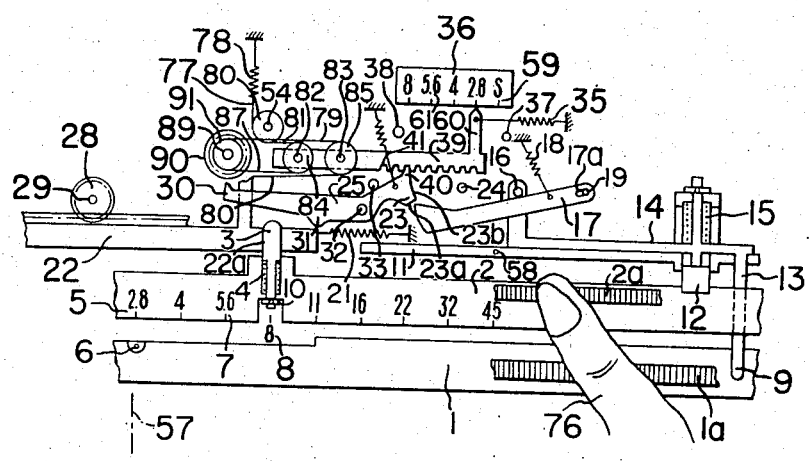

In the second embodiment, the basic mode of operation is substantially similar to that of the first embodiment described hereinabove with reference to FIGS. 3 to 6, however, it should be noted again that the differential mechanism is comprised of a flexible member and pulleys instead of planetary gears. As shown in FIG. 8, the lens to be mounted is first pressed against the camera body as in the case of first embodiment described with particular reference to FIG. 4. FIG. 9 corresponds to FIG. 5 of the first embodiment and illustrates engagement of the coupling pin 3 of the lens with the aperture indicating ring 22. When the aperture indicating ring 22 is displaced to the left in FIG. 9, the rotations of the gear 90 and consequently the pulley 91 are stopped by the hook 30 of the lock lever 25 while the correction ring 39 is rotated by the flexible member, whereby the maximum aperture or the full open f-number correction is started. As described in the first embodiment, the correction is introduced into the exposure calculating mechanism through the pulley 80, the coupling shaft 54 and the intermediate gear 53. FIG. 10 illustrates the lens being completely mounted to the camera body and the maximum aperture (or the fully opened f-number) correction for this lens has been accomplished.

Figure 11:
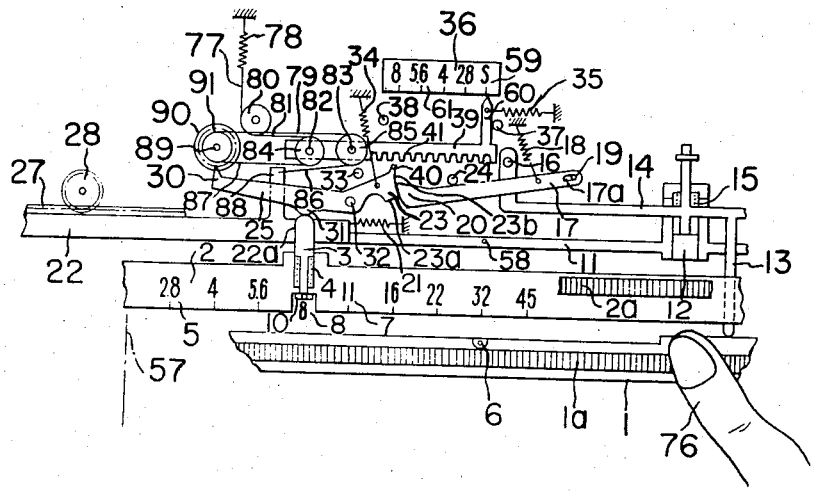
FIG. 11 is a developed view for the explanation of the removal of the lens from the camera body of the second embodiment.

FIG. 11 shows the lens being removed from the camera from the position shown in FIG. 10. To remove the lens from the camera body, first the lock button 12 is pressed thereby disengaging the lens locking pin 13 from the hole 9 of the lens main body 1 and thereafter the lens is rotated in the clockwise direction. When the coupling pin 3 of the lens contacts with the projection 31 of the lock lever 25 and reaches a predetermined position, the lock lever 25 is caused to rotate in the clockwise direction from the position shown in FIG. 10 so that the rotation of the gear 90 and the pulley 91 is stopped by the hook 30 of the lock lever 25. Simultaneously, the projection 40 is disengaged from the notch 41 of the correction ring 39 so that the correction ring 39 is retruned to the position indicated by S under the action of the spring 35 and stopped by the stopper 37. In this case, the pulley 80 is caused to rotate in the counterclockwise direction so that the fully opened f-number correction which is introduced into the exposure calculating mechanism during lens mounting is relieved. Upon rotation in the clockwise direction of the lock lever 25, the lower side edge 23a thereof causes the clamp lever 17 to rotate slightly in the counterclockwise direction and thereafter continues its rotation in the clockwise direction until the pawl 20 of the clamp lever 17 slides over the side edge 23b of the lock lever 25 and is stopped by the pin 24. Thus, the lock lever 25 is clamped as shown in FIG. 9 so that rotation of the lock lever in the counterclockwise direction is prevented, as shown in FIG. 11.

As is clear from FIG. 10, upon rotation of the lens in the clockwise direction for removal of the lens from the camera body, the aperture indicator ring 22 contacts the camera body portion 11 so that the ring 22 is not permitted to rotate further. In this case, the hand 76 does not contact the aperture ring 2 of the lens as shown in FIG. 11, but grips only the lens body 1 so as to rotate it until the mark 6 on the lens is aligned with the mark 58 on the camera body. When the lens is pulled toward the operator from the position shown in FIG. 11, the lens coupling pin 3 is pulled out of the hole 22a of the aperture indicator ring 22 while the locking pin 13 is extended forwardly again by the spring 15. At this time, the arm 14 is forwardly moved so that the pin 16 causes the clamp lever 17 to rotate against the spring 18 in the counterclockwise direction. Therefore, the lock lever 25 is set free and caused to rotate in the counterclockwise direction by the spring 34 so that the correction ring 39 is held at the reference position (S-position) by the projection 40 whereby the hook 30 is disengaged from the gear 90. Thus, all of the components are returned to the position shown in FIG. 7. The mode or removing the lens from the camera body has been described with particular reference to the second embodiment of the present invention, but it will be understood that the lens may be removed from the camera body in the first embodiment in the similar manner as described above.

The present invention has been so far described with the particular reference to some illustrative embodiments thereof, but it will be understood that variations and modifications can be effected without departing from the true spirit of the present invention as described hereinabove and as defined in the appended claims.

What is claimed is:

1. A camera having an exposure meter measuring the light intensity transmitted through a fully opened objective lens comprising:

an interchangeable objective lens having a stop presetting means;

a lens body including a lens barrel and an aperture ring for adjusting said stop presetting means;

a pair of index members provided on said lens barrel and the camera body, respectively, the index on said lens barrel set to be aligned with said index on said camera body upon mounting of said lens body on said camera body;

a signal member formed at a predetermined position on said aperture ring, said signal member when mounted on said camera body being set at a distance starting from said index of said lens body and corresponding to the maximum aperture ratio of said interchangeable objective lens;

a connecting member movably disposed within said camera body and engageable with said signal member upon mounting of said lens body on said camera body, said connecting member being biased to the rest position;

a transmission means disposed within said camera body for transmitting movement of said connecting member to an exposure calculating mechanism of said exposure meter, said transmission means including a first movable transmission member, a second movable transmission member adapted to move independently to said first transmission means, and a third and a fourth transmission members rotatably disposed on said first transmission member, said third transmission member engaging said connecting member, said fourth transmission member engaging said second transmission member and said exposure calculating mechanism; and an engaging means for locking said second transmission member when said signal member engages said connecting member, said engaging means unlocking said second transmission member and locking said first transmission member upon completion of mounting of said lens body whereby from the time said signal member engages said connecting member to completion of said mounting of said lens body of said camera body, movement of said connecting member is introduced into said exposure calculating mechanism through said third, first and fourth transmission members, and the preset stop value adjusted by said aperture ring upon completion of mounting of said lens is introduced into said exposure calculating mechanism through said third, second and fourth transmission members.

2. The camera as defined in claim 1 further comprising:
- a display means for the maximum aperture ratio of the interchangeable objective lens mounted, said display means including a display member provided with numerals thereon showing the maximum aperture ratio of said objective lens mounted;
- a pointer connected to said first transmission member and indicating said numerals whereby from the time when said signal member is connected to said connecting member until completion of mounting of said objective lens the amount of movement of said connecting member is transmitted to said first transmission member through said third transmission member so that said pointer indicates the numerical value corresponding to the maximum aperture ratio of said objective lens.

3. The camera as defined in claim 1, wherein said connecting member is provided with an orifice connected to said signal member during the mounting operation of said objective lens to the camera body, and said signal member is biased toward the outwardly extending direction from the lens body; and further comprising:

- a locking lever is rotatably adapted to the camera body and biased in a direction to engage said first transmission member, said locking lever having a projection in opposed relation with said orifice of said connecting member so that during the mounting operation of said objective lens to the camera body, said signal member is fitted through said orifice and contacts said projection of said locking lever to thereby cause engagement of said locking lever with said second transmission member; and
- a positioning means for determining the position where said objective lens is fully mounted on said camera body, said positioning means including a notch formed on the lens barrel, a pin mounted on the camera body for stopping the rotation of the lens barrel by the engagement with said notch, said pin being biased in the outwardly extending direction from said camera body, and an intermediate lever holding said second transmission member in locked position by said locking lever until said pin is completely disposed within said notch, said intermediate lever being associated with said pin when said pin engages said notch whereby said second transmission member is disengaged and said intermediate lever causes said locking lever to engage said first transmission member.

4. The camera as defined in claim 1 wherein said third transmission member is directly connected to said connecting member and said second transmission member and wherein said fourth transmission member is directly connected to said second transmission member and said exposure calculating mechanism.

5. The camera as defined in claim 1 wherein said third transmission member is connected to said connecting member and said second transmission member through a flexible belt and wherein said fourth transmission member is connected to said second transmission member and said exposure calculating mechanism through a flexible belt.

* * * * *